(No Model.)
A. WOOD.
MECHANICAL SPEEDING DEVICE.
No. 286,890. Patented Oct. 16, 1883.
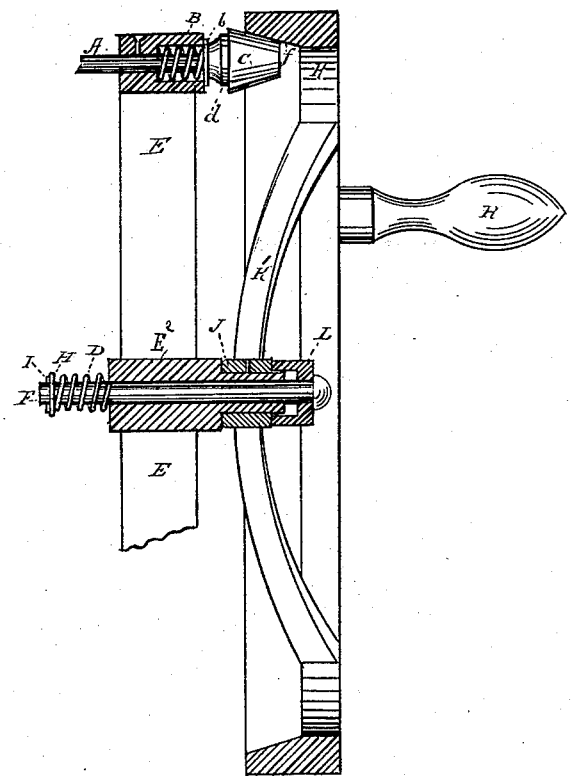
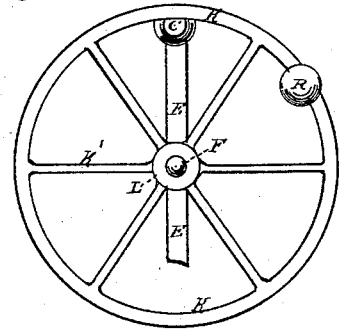
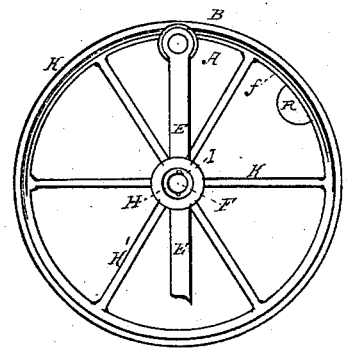
Witnesses
N. S. Wright.
A. E. Inglis.
Inventor
Alfred Wood
per W. W. Leggett,
Attorney

UNITED STATES PATENT OFFICE.

ALFRED WOOD, OF DETROIT, MICHIGAN, ASSIGNOR OF SIXTY-SIX ONE-HUNDREDTHS TO H. HUBERT HUMPHREY AND STEPHEN W. ITSELL, BOTH OF SAME PLACE.

MECHANICAL SPEEDING DEVICE.

SPECIFICATION forming part of Letters Patent No. 286,890, dated October 16, 1883.

Application filed December 18, 1882. (No model.)

*To all whom it may concern:*

Be it known that I, ALFRED WOOD, of Detroit, county of Wayne, State of Michigan, have invented a new and useful Improvement in Mechanical Speeding Devices; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

In the drawings, Figure 1 is a vertical section of an apparatus embodying my invention. Fig. 2 is a front elevation, and Fig. 3 a rear view, of the same.

The object of my invention is to provide a mechanical speeding device adapted more particularly for winding bobbins, but also adapted for egg-beaters, apple-parers, and for other analogous purposes. A device for winding bobbins, constructed as hereinafter described, is mounted upon a sewing-machine stand in any suitable manner, and has no connection with the driving mechanism of the machine. In other words, it is an independent device not designed to be thrown in or out of gear with said driving mechanism, as in bobbin-winders of the usual construction.

In carrying out my invention, K is a speeding-wheel provided with a rim or flange, $f$, and preferably with curved spokes K', said rim and spokes projecting inward or rearward, and said rim beveled on its interior edge, as shown in Fig. 1.

E represents any suitable frame for supporting the device. $E^2$ is a suitable stationary journal secured in said frame.

J is the hub of the wheel.

L is the cap, and F the securing bolt or pin, by which the hub and cap are fastened to the journal, said bolt being provided preferably with a spring, D, secured in place upon the bolt by a washer, H, and pin I, the spring being adapted to take up the end wear upon the hub or cap.

A is a bearing provided with a cone-shaped extremity adapted to engage closely against the beveled rim of the wheel.

B is a stationary journal secured to the frame in which said bearing revolves, and preferably provided with the spring $b$, adapted to keep the cone suitably engaged in close contact with the rim of the wheel. Upon the end of the bearing A opposite said cone may be attached the bobbin, egg-beater, apple-parer, or any desired apparatus to be revolved.

R is the propelling-handle, by which the speeding-wheel is revolved.

The operation of the device is as follows: When the speeding-wheel K is revolved, the bearing A is revolved by the frictional contact of the cone C upon the under surface of the beveled rim $f$ of said wheel.

It is evident that a mechanical speeding-gear as so constructed is adapted to give a very rapid revolution to the bearing A and to the bobbin, or whatever else it may be desired to have secured thereto.

What I claim is—

1. A mechanical speeding device consisting of a wheel provided with a projecting internally-beveled rim, a frame provided with a stationary bearing, upon which said wheel turns, and a cone-shaped hub or wheel constantly held in contact with the beveled rim of the speeding-wheel, and provided with an axis or spindle for transmitting motion to a bobbin or other device, substantially as described.

2. A mechanical speeding device consisting of a speeding-wheel provided with a projecting beveled rim, its hub supported by a stationary journal upon a suitable frame, said hub held in place by a cap, L, and securing-bolt F, and in connection therewith a stationary journal, B, secured to said frame, and a bearing adapted to revolve in said journal, and provided with a cone-shaped extremity adapted to engage in frictional contact with the beveled rim of the wheel and to be rotated thereby, substantially as described.

3. A mechanical speeding device consisting of a speeding-wheel provided with a projecting beveled rim, its hub supported by a stationary journal upon a suitable frame, said hub held in place by a cap, L, and securing-bolt F, provided with a spring, D, and in combination therewith a stationary journal, B, and a bearing adapted to revolve in said journal and terminating with a cone-shaped extremity at one end, adapted to engage in frictional contact with the beveled rim of the wheel and to be rotated thereby, said bearing provided with means for keeping the cone in firm connection with said rim, substantially as and for the purpose described.

In testimony whereof I sign this specification in the presence of two witnesses.

ALFRED WOOD.

Witnesses:
N. S. WRIGHT,
A. E. INGLIS.